March 7, 1967    J. A. MOESCHLER    3,307,205
BACK-TO-BACK PLUMBING FITTING
Filed June 14, 1963    2 Sheets-Sheet 1

INVENTOR.
JOHN A. MOESCHLER
BY
ATTORNEY

March 7, 1967   J. A. MOESCHLER   3,307,205
BACK-TO-BACK PLUMBING FITTING

Filed June 14, 1963   2 Sheets-Sheet 2

INVENTOR.
JOHN A. MOESCHLER
BY
ATTORNEY

United States Patent Office 3,307,205
Patented Mar. 7, 1967

3,307,205
BACK-TO-BACK PLUMBING FITTING
John A. Moeschler, Los Angeles, Calif., assignor of one-half to William Douglas Sellers, Pasadena, Calif.
Filed June 14, 1963, Ser. No. 287,968
14 Claims. (Cl. 4—192)

This invention relates to plumbing fittings and more particularly to an assembly conveniently designated a back-to-back fitting of unusual versatility and providing both hot and cold water flow passages to two different pairs of outlets located on the same or opposite sides of a building wall.

When installing plumbing for cold and hot water outlets for washbowls, sinks, shower stalls, bathtubs and the like it is often times desirable to provide for multiple outlets for both hot and cold water. In one typical arrangement it is desirable to have one set of controls for hot and cold water outlets for a bathtub and another set to service an overhead shower outlet. In a second typical arrangement it is desirable to provide similar facilities for wash basins located on the opposite sides of a divider wall, as for example between bathroom facilities on one side of the wall and kitchen facilities on the other. This permits a common pair of hot and cold water supply pipes to service both the kitchen and the bathroom. In each case it is desirable that the hot water faucet be located to the user's left and the cold water to the user's right which necessitates a multiplicity or pipe connections concealed within the intervening wall. Costly and complex plumbing has heretofore been necessary to accommodate these needs. The problem is customarily further complicated by the need for locating an atmospheric vent pipe in the wall space and passing vertically between the cold and hot water outlets. These various factors have presented serious problems both in making the initial installation even where done before the plaster, lathe, and other wall finishing materials are installed and particularly when it becomes necessary to service the installation for any reason.

The present invention provides a unitary preassembled unit equally suitable for use in completing connections in various plumbing arrangements involving pairs of outlet faucets whether on the same or the opposite sides of a dividing wall. The unitary assembly embodying characteristic features of the invention has a pair of openings securable respectively to the cold and hot water supply pipes and two sets of outlets located at its horizontally spaced opposite ends. Each set of outlets includes one for hot water and one for cold water each appropriately disposed either for direct connection to outlet faucets or to showerhead plumbing.

The fitting assembly preferably includes a pair of one-piece fittings and a pair of interconnecting tubular members arranged parallel to one another with their ends telescoped into seating openings in the one-piece fittings. The two tubes and the two fittings are preassembled and bonded together in readiness for connection to customary plumbing fittings. The length of the two fittings is less than the width of customary studding thereby permitting the longitudinal axes of the fittings to be located in laterally spaced vertical planes and extending either horizontally crosswise of the studding or vertically lengthwise of the studding. Another feature is the fact that the two pipes connecting the two fittings are offset to a position near one end of the fittings thereby providing adequate room within the wall for installation therepast of other piping such as a vent pipe to the atmosphere or a drain pipe to sewer connections.

Accordingly it is a primary object of the present invention to provide a unique compact plumbing assembly for use in connecting a single pair of hot and cold water service pipes to two pairs of hot and cold water outlet pipes.

Another object of the invention is to provide a unique preassembled plumbing assembly having provision at its opposite ends for connection to hot and cold water service pipes and having provision at each of its opposite ends for discharging both hot and cold water.

Another object of the invention is the provision of an improved plumbing fitting for use in completing two sets of hot and cold water outlets from a single set of service supply pipes and featuring a pair of elongated members adapted to be mounted within a conventional wall with their longitudinal axes extending selectively either vertically or transversely of the wall and lying in spaced-apart vertical planes normal to the wall.

Another object of the invention is the provision of a simple inexpensive plumbing assembly without moving parts and having three openings at its opposite ends and wherein one set of openings at its opposite ends may be connected to hot and cold water service pipes and wherein the other two sets of openings at each end are arranged to discharge separate streams of water from the two service pipes.

Another object of the invention is the provision of a plumbing assembly adapted to be connected to hot and cold water service pipes and including cross-over pipes offset to one side of a plane through the axes of these service pipes.

These and other more specific objects will appear upon reading the following specification and claims and upon considering in connection therewith the attached drawings to which they relate.

Referring now to the drawings in which a preferred embodiment of the invention is illustrated:

Figure 6:
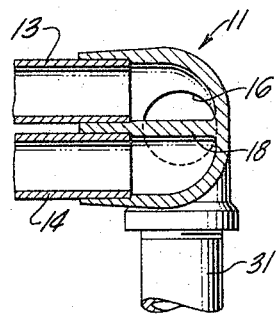
Figure 4:
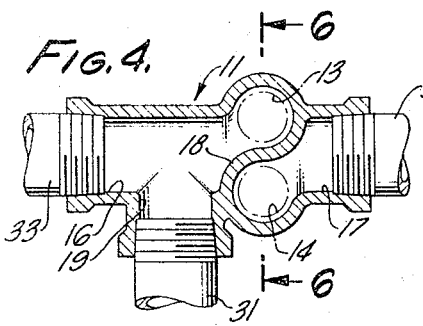
Figure 5:
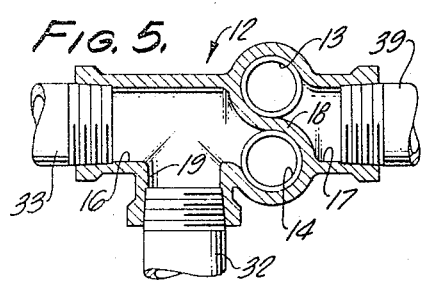
Figure 3:
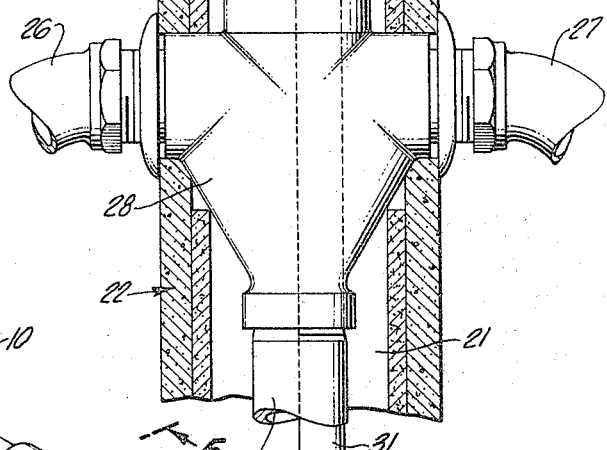
FIGURE 3 is a perspective view of the fitting assembly per se with the parts broken away to show the interior construction.
Figure 3:
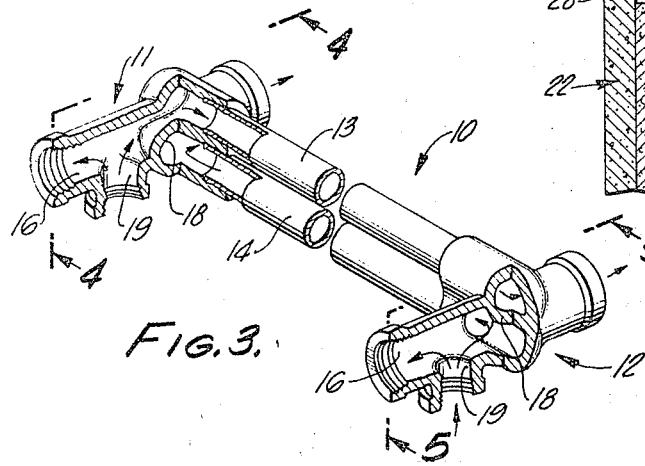
Figure 7:
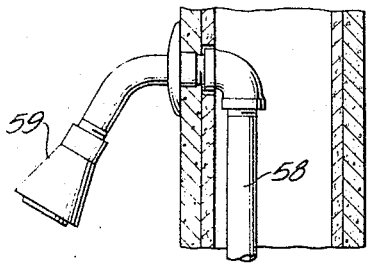
Figure 8:
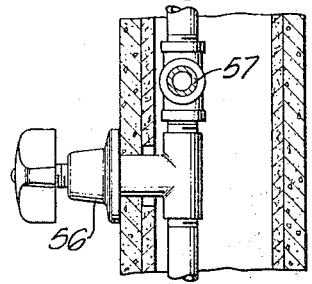
Figure 8:
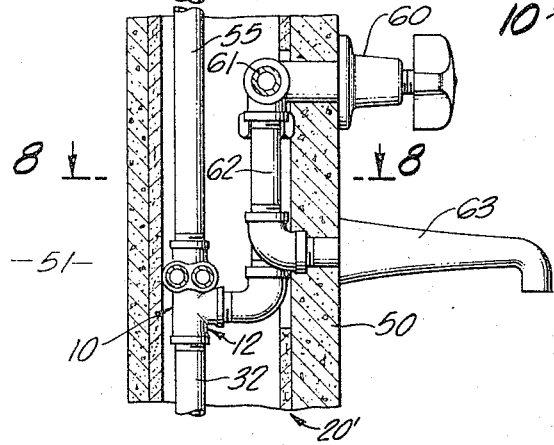
Figure 8:
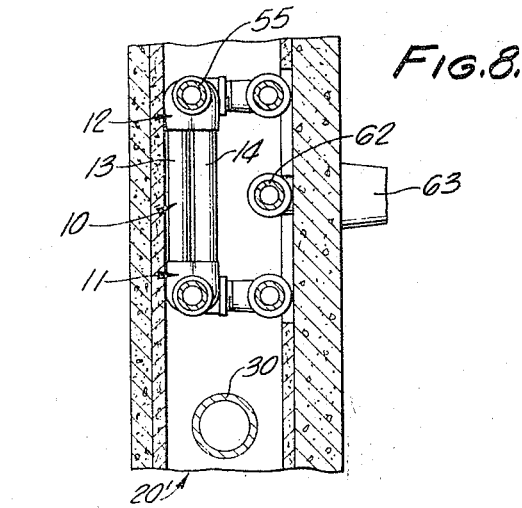
Figure 9:
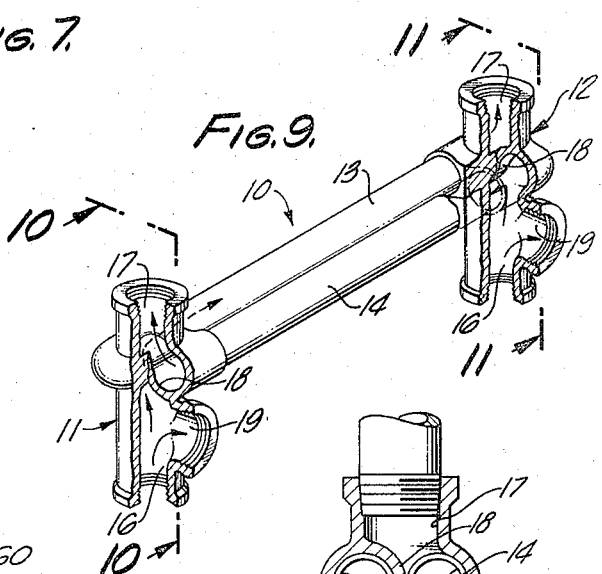
Figure 10:
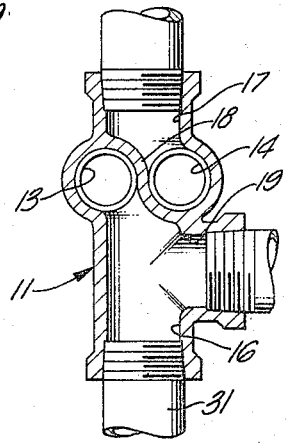
Figure 11:
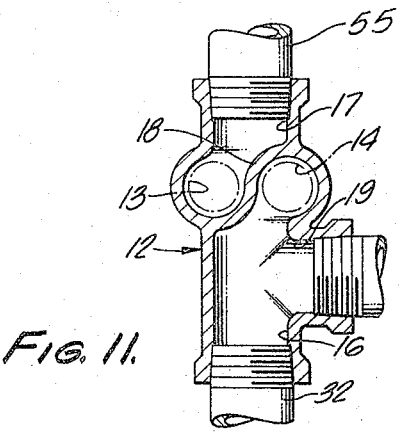

FIGURES 4 and 5 are cross sectional views taken along lines 4—4 and 5—5 on FIGURE 3;

FIGURE 6 is a cross-sectional view taken along line 6—6 on FIGURE 4;

FIGURE 7 is a vertical sectional view through another typical plumbing installation making use of the invention fitting and showing one pair of outlets connected to a mixing faucet on one side of the wall and the other pair of outlets connected to a mixer for a shower head;

FIGURE 8 is a cross-sectional view taken along 8—8 on FIGURE 7;

FIGURE 9 is a perspective view of the fitting proper with portions broken away; and FIGURES 10 and 11 are cross-sectional views taken along lines 10—10 and 11—11 respectively on FIGURE 9.

Referring more particularly to FIGURES 4 to 6, it will be understood that the plumbing assembly unit per se, designated generally 10, comprises a pair of generally tubular one-piece molded members 11, 12 telescoped over the opposite ends of a pair of parallel connecting pipes 13, 14 and one of which is a mirror image of the other. Desirably pipes 13 and 14 have plain unthreaded ends which telescope into tubular passageways opening through the sides of the two castings and are held assembled therein by soldering, brazing or other suitable bonding.

Members 11, 12 have a generally elongated tubular body preferably not longer than the width of standard studding and provided with aligned openings 16 and 17 at their opposite ends. An S-shaped dividing wall 18 traverses and separates passages 16 and 17 from one another and is so arranged that passage 17 opens into one end of tube 14 and passage 16 opens into the associated end of tube 13. Each member is also provided with a third large bore passageway 19 close to the threaded end of passage 16 and its outer end may be threaded as may the outer ends of passages 16 and 17. Although these passages are illustrated as threaded it will be recognized that the outer ends of some only or all of the passages may be bored to telescope over the ends of unthreaded pipe or other plumbing fittings and bonded thereto by soldering, brazing or other suitable bonding technique.

Figure 1:
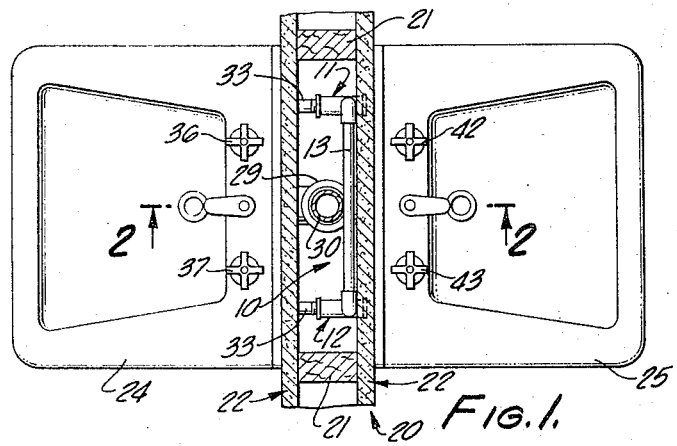
FIGURE 1 is a top plan view partially in section showing one typical use of the present invention employed to service wash basins located on opposed sides of a room wall.
Figure 2:
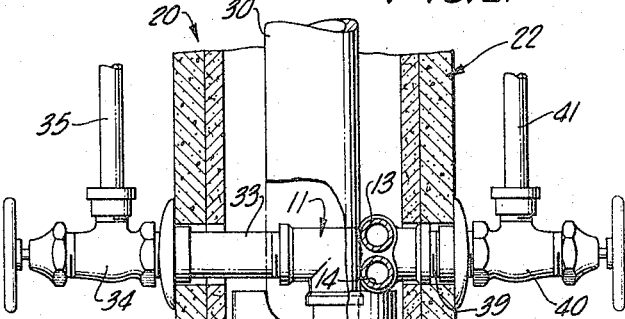
FIGURE 2 is a fragmentary cross-sectional view on an enlarged scale taken along line 2—2 on FIGURE 1.

Referring now more particularly to FIGURES 1 and 2 it is pointed out that assembly 10 as there shown is concealed within a dividing wall 20 separating two rooms. Wall 20 is of any conventional construction and as here shown includes studding 21 to the opposite edges of which is secured suitable plaster wallboard or the like 22, 22. Suitably mounted on the opposite sides of wall 20 are a pair of wash basins 24, 25 having their outlet drains connected by way of the usual trap fittings 26, 27 and coupling 28 to a drain pipe 29. The usual atmospheric vent pipe 30 is connected to the top of fitting 28 and opens through the roof or other suitable vent port in known manner.

When assembly 10 is used to service hot and cold water faucets of wash basins mounted back-to-back on the opposite sides of a partitioning wall, as shown in FIGURE 1, the longitudinal axes of members 11 and 12 is arranged horizontally crosswise of the wall in the manner made clear by FIGURES 1 and 2 with passages 19 opening downwardly and connected to the hot and cold water service pipes 31 and 32. Passages 16 and 17 then serve as the water outlets servicing the faucets for basin 24 and passages 17 as the outlets servicing the faucets for basin 25. The connections for these faucets are best shown in FIGURE 2, passages 16 discharging into nipples 33 connected at their outer ends to cutoff valves 34. The outlet side of these valves are connected by a riser 35 to the hot water faucet only knob 36 of which is visible in FIGURE 1. It will be understood that the outlet passage 16 of casting 12 is similarly connected to the cold water faucet having a control handle 37.

Outlet passage 17 of casting 11 is similarly connected to the cold water faucet of wash basin 25. For example passage 17 opens into a nipple 39 connected with a cutoff valve 40 discharging through riser 41 to the cold water faucet of sink 25 having a control knob 42. Identical fittings are provided for outlet passage 17 of casting 11 and lead to the hot water valve of basin which valve has a control knob 43.

From the foregoing it will be clear that the two wash basins 24, 25 have their hot water control knobs 36 and 43 positioned to the left of the user whereas the cold water control knobs 37 and 42 are positioned to the user's right in accordance with customery standard practice.

From the foregoing it will be evident that hot water rising through service pipe 31 enters member 11 and flows through passage 16 and the connecting conduits to the valve controlled by knob 36 in basin 24. Other portions of this hot water enters crossover pipe 13 of member 11 and discharges into member 12 for flow through passage 17 leading to the valve controlled by hot water knob 43 for basin 25. Likewise cold water entering through service pipe 32 enters member 12, flows to the left through the described nipple and pipe fittings leading to the cold water valve controlled by knob 37 of basin 24 and another part passes through crossover pipe 14 into member 11 for passage to the fittings leading to the cold water valve controlled by knob 42 of basin 25.

Referring now to FIGURES 7 to 11, there is shown an alternate arrangement of assembly unit 10. In this arrangement the fittings are located in a divider wall 20' separating the compartment for the bathtub 50 from shower stall 51, members 11 and 12 then having their longer axes disposed vertically rather than horizontally. In this mode of use passages 16 are connected to the hot and cold water service pipes 31, 32. The upwardly discharging passage 17 of member 11 carries cold water entering through crossover conduit 13 upwardly through riser 55 into the cold water control valve 56. This water then passes into a horizontal crossover mixer pipe 57 connected with an outlet pipe 58 leading to shower head 59. Although not shown it will be understood that hot water entering member 12 flows through crossover pipe 14 into member 11 and rises through similar fittings to a hot water control valve, not shown, for flow into mixer pipe 57 where it mixes with the cold water and then flows through pipe 58 into the showerhead.

The outlet end of passages 19, 19 and the two members are connected through typical pipe fittings to separate hot and cold water control valves, only the cold water control 60 of which is shown. Cold water passing this valve passes into a mixer tube 61 having an outlet for both cold and hot water opening into fittings 62 leading to the discharge spout 63 for tub 50.

It will therefore be evident that the second described arrangement of unit 10 functions in the same manner described in connection with FIGURES 1 through 6 to supply hot and cold water to a bathing tub and to a shower stall each having its own hot and cold water valves properly disposed in accordance with customary practice with the cold water control on the right and the hot water control on the left. As will be best observed from FIGURE 8 the atmospheric vent pipe 30 is disposed entirely to one lateral side of assembly 10. This arrangement is desirable because of the crossover pipes 57 and 61 of the two mixing assemblies.

It will be understood that the described plumbing fitting may be advantageously assembled to service plumbing with at least one end of the crossover conduits 13, 14 disassembled from one of the castings 11, 12. After the molded fitting members have been connected in the usual manner, the piping can readily be sprung apart sufficiently to receive the tinned ends of the crossover pipes following which the junctions are bonded together in any suitable well known manner.

From the foregoing detailed description of two typical modes of installing the unitary fitting assembly of this invention, it will be readily apparent to those skilled in the art how the unique unit can be utilized in various other manners all in accordance with the principles of this invention.

While the particular back-to-back plumbing fitting herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A one-piece elongated plumbing fitting suitable for use in pairs along with a pair of identical straight lengths of tubing in completing hot and cold water connections from vertically disposed service pipes to closely associated outlets for cold and hot water and which plumbing fitting is adapted to be installed between the faces of a building wall with its longitudinal axis lying in a vertical plane extending transversely of the wall and extending selectively either vertically or horizontally of said vertical plane, said fitting comprising an elongated unitary tubular member having first and second oppositely facing openings extending axially of one another through its opposite ends for discharging hot and cold water respectively, a third opening through the side of said member adapted to be connected to a source of water, a fourth and a fifth opening extending in the same direction laterally through the side of said tubular member in parallel closely spaced relation in a plane normal to the plane of the first, second, and third openings in the member, and a single internal partition extending crosswise of said member between said fourth and fifth openings and so arranged and constructed that said first and fifth openings are in unobstructed communication with one another and that the second, third and fourth openings are in unobstructed communication with one another.

2. A plumbing fitting as defined in claim 1 characterized in that said first, second and third openings are threaded interiorly thereof to seat threaded pipe fittings.

3. A plumbing fitting as defined in claim 1 characterized in that said fourth and fifth openings are provided with smooth-surfaced interior side walls adapted to provide a snug seating fit with individual pipes and to be sealed thereto by a sweated junction using a heat fusible bonding material.

4. A plumbing fitting as defined in claim 1 characterized in that said third opening is located near one end of said tubular member and in that said fourth and fifth openings are located near the other end of said member with axes lying in a common plane extending crosswise of said member.

5. A plumbing fitting as defined in claim 1 characterized in that the axis of said third opening lies in a plane common to the aligned axes of said first and second openings and generally normal to a plane common to the axes of said fourth and fifth openings.

6. A plumbing fitting as defined in claim 1 characterized in that said fourth and fifth openings are spaced to either side of a plane passing through the longitudinal axis of said member and lying parallel to the axes of said fourth and fifth openings.

7. A unitary plumbing subassembly suitable for use in completing hot and cold water connections to two pairs of outlets for hot and cold water which pairs are located selectively at the same elevation on the opposite sides of a wall or at widely vertically-separated elevations on the same or opposite sides of a wall and both of which modes of installation are adapted to be served from a single set of hot and cold water supply pipes, said subassembly comprising a pair of mirror-image tubular members and a pair of straight short interconnecting conduits for conducting separate streams of hot and cold water between said members from lateral inlets and outlets opening through the side walls of said members between the opposite ends thereof, each of said pair of tubular members being mountable between the exterior sides of a wall with the longitudinal axes of said tubular members lying in respective vertical planes extending transversely of and generally normal to the surfaces of a wall, partition means extending crosswise of said members between said lateral inlet and outlet openings, an axial opening through each of the opposite ends of said members and a third opening through the side wall of said members near one end thereof and having an axis in a plane normal to the axes of said pair of conduits.

8. A plumbing subassembly as defined in claim 7 characterized in that the four components thereof are held assembled to one another by fluid tight bonded joints in readiness for installation as a unit between a pair of hot and cold water supply pipes and two pairs of hot and cold water distributing facilities.

9. A plumbing subassembly as defined in claim 7 characterized in that the length of said molded members is not in excess of the width of conventional wooden studding employed in construction building walls whereby said subassembly is adapted to be installed between such walls with the axes of said end openings extending generally horizontally crosswise of the wall and substantially normal to the wall surfaces and with said connecting pipes lying generally horizontally between the wall surfaces and spaced sufficiently from one interior side of said wall surfaces to accommodate a vertically extending drainpipe or the like.

10. A plumbing subassembly as defined in claim 7 characterized in that said subassembly is adapated to be supported with said connecting conduits extending generally horizontally and with the longitudinal axes of said castings extending generally vertically between the exterior coverings of a hollow building wall, the lowermost openings of said members being connectable respectively with hot and cold water service pipes, the uppermost openings of said members being connectable respectively with hot and cold water distributing pipes opening laterally through one side of said hollow wall, and the lateral openings from the sides of said members being connectable to distribute hot and cold water respectively laterally through the other side of said hollow wall.

11. In a plumbing installation for supplying hot and cold water from a single source of each through a wall and to separate cold and hot water control faucets located on the opposite faces of an intervening hollow wall, that improvement which comprises a unitary cold and hot water distributing subassembly concealed within said hollow wall between the pairs of control faucets on the opposite sides of the wall, said subassembly having a pair of elongated tubular members having their respective longitudinal axes lying in vertical laterally-spaced planes extending transversely of said hollow wall and each having a single inlet respectively connectable to a vertically disposed hot and cold water supply pipe and each member having a separate set of hot water and cold water distributing outlets respectively connectable to separate hot and cold water control faucets, and means including internal partitions within said members and a pair of straight short conduits lying closely adjacent and parallel to one another and interconnecting said members through the respective side walls thereof for conducting separate streams of hot and cold water from said supply pipes between said members and distributing the same to an associated outlet faucet.

12. A plumbing installation as defined in claim 11 characterized in the provision of a common drain outlet for the water distributed to the opposite sides of said wall, said outlet extending vertically through said wall and including an upstanding vent rising vertically through said hollow wall between said two members of said subassembly and laterally to one side of the two conduits interconnecting said members.

13. A plumbing assembly for use in completing connections between a pair of vertically-disposed hot and cold water service pipes and two sets of hot and cold water outlets concealed between the exterior surfaces of a conventional hollow building wall, said assembly having a pair of tubular members each formed in one piece and having axial passages opening through their opposite ends, said axial passages lying in laterally-spaced vertical planes extending transversely through the building wall and generally normal to its exterior surfaces, a pair of parallel pipes interconnecting said members through the side walls thereof in an area adjacent one end thereof and having at least one pair of ends adapted to be assembled and fuse-bonded to one of said members after the latter has been assembled to service plumbing, said members having internal partition means across said axial passages and separating the flow of said parallel pipes from one another, and means forming a fifth opening from each of said members with its inner end in communication with one only of said axial passages.

14. A unitary plumbing assembly for use in completing water connections between plumbing facilities on the opposite sides of a building wall and effective to service similarly related hot and cold water control valves on the opposed sides of said wall from a single pair of vertically disposed hot and cold water service pipes concealed within said wall, said assembly having a pair of mirror-image open-ended one-piece tubular members interconnectable by a pair of cross-over pipes positioned closely beside one another adjacent one set of ends of said members and insertable into one of said members after the latter has been assembled to service plumbing, the longitudinal axes of said one-piece members when installed between the surfaces of a hollow wall lying in laterally spaced vertical planes extending transversely through the wall, partition means across the interior of said members positioned to separate the flow in one of said cross-over pipes from the flow in the other, and an opening through the side wall of each of said members having its axis lying generally normal to the longitudinal axes of said members and of said cross-over pipes.

References Cited by the Examiner
UNITED STATES PATENTS

| | | | |
|---|---|---|---|
| 623,640 | 4/1899 | Warwick | 4—208 X |
| 1,232,855 | 7/1917 | Schoonover | 285—132 |
| 1,582,529 | 4/1926 | Mueller | 285—150 X |
| 1,762,619 | 6/1930 | Fleming | 285—150 X |
| 2,439,712 | 4/1948 | Brady | 285—132 |
| 2,460,665 | 2/1949 | Wurzburger | 285—287 X |
| 2,538,835 | 1/1951 | Harvey et al. | 137—604 X |
| 3,078,476 | 2/1963 | Doty | 4—192 |

LAVERNE D. GEIGER, *Primary Examiner.*

CARL W. TOMLIN, *Examiner.*

S. R. MILLER, H. J. GROSS, *Assistant Examiners.*